United States Patent
Shiga et al.

(10) Patent No.: US 8,987,601 B2
(45) Date of Patent: Mar. 24, 2015

(54) PARTITION-ATTACHED SHIELD PIPE AND WIRE PROTECTION STRUCTURE FOR END SECTION THEREOF

(75) Inventors: Kouki Shiga, Mie (JP); Hidetoshi Sugino, Mie (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 132 days.

(21) Appl. No.: 13/991,958

(22) PCT Filed: Oct. 20, 2011

(86) PCT No.: PCT/JP2011/074114
§ 371 (c)(1),
(2), (4) Date: Jun. 6, 2013

(87) PCT Pub. No.: WO2012/132076
PCT Pub. Date: Oct. 4, 2012

(65) Prior Publication Data
US 2013/0269981 A1 Oct. 17, 2013

(30) Foreign Application Priority Data

Mar. 28, 2011 (JP) .................................. 2011-070781

(51) Int. Cl.
*H01B 17/58* (2006.01)
*B60R 16/02* (2006.01)
*H02G 3/04* (2006.01)
*H02G 3/06* (2006.01)

(52) U.S. Cl.
CPC .......... *H01B 17/583* (2013.01); *B60R 16/0215* (2013.01); *H02G 3/0418* (2013.01); *H02G 3/0481* (2013.01); *H02G 3/06* (2013.01)
USPC ........ 174/136; 174/72 A; 174/72 R; 174/135; 174/77 R; 174/97; 248/49; 248/68.1

(58) Field of Classification Search
USPC ........... 174/136, 68.3, 72 A, 72 R, 135, 77 R, 174/68.1, 88 R, 93, 70 C, 95, 97, 152 G, 174/153 G, 152 R; 248/49, 68.1
See application file for complete search history.

(56) References Cited

U.S. PATENT DOCUMENTS

| 1,856,109 | A | * | 5/1932 | Murray et al. | ................. 174/146 |
| 5,305,797 | A | * | 4/1994 | Roy, Sr. | ......................... 138/108 |
| 5,526,549 | A | * | 6/1996 | Mori et al. | ........................ 16/2.1 |
| 8,357,854 | B2 | * | 1/2013 | Thompson | ................... 174/77 R |
| 8,729,394 | B2 | * | 5/2014 | Clark et al. | ............... 174/113 R |

FOREIGN PATENT DOCUMENTS

| JP | 2-114180 | 9/1990 |
| JP | 10-059153 | 3/1998 |
| JP | 2002-78138 | 3/2002 |
| JP | 2006-269201 | 10/2006 |
| JP | 2006-311699 | 11/2006 |
| JP | 2007-26821 | 2/2007 |

OTHER PUBLICATIONS

International Search Report dated Nov. 29, 2011 with English language translation.

* cited by examiner

*Primary Examiner* — Angel R Estrada
*Assistant Examiner* — Dimary Lopez Cruz
(74) *Attorney, Agent, or Firm* — Greenblum & Bernstein, P.L.C.

(57) ABSTRACT

A plurality of wires are prevented from being damaged from contact with an edge of an end portion of a shield pipe through which the wires are inserted. A shield pipe through which a wire harness including a plurality of wires routed in a hybrid automobile or an electric automobile has partition walls separating the plurality of inserted wires one by one and projecting continuously in an axis direction of the pipe from an inner surface of a peripheral wall of a pipe main body. The partition walls corresponding to the number of wires inserted through the shield pipe are provided radially in a cross section. Each of the partition walls has at least one bending portion extending in the axis direction of the pipe.

8 Claims, 6 Drawing Sheets

PARTITION-ATTACHED SHIELD PIPE AND WIRE PROTECTION STRUCTURE FOR END SECTION THEREOF

TECHNICAL FIELD

The present invention relates to a partitioned shield pipe and a wire protection structure for an end portion of a partitioned shield pipe, specifically, intended to prevent a wire pulled out from a shield pipe from damage due to contact with an edge of an end portion of a pipe.

BACKGROUND ART

Figure 10:
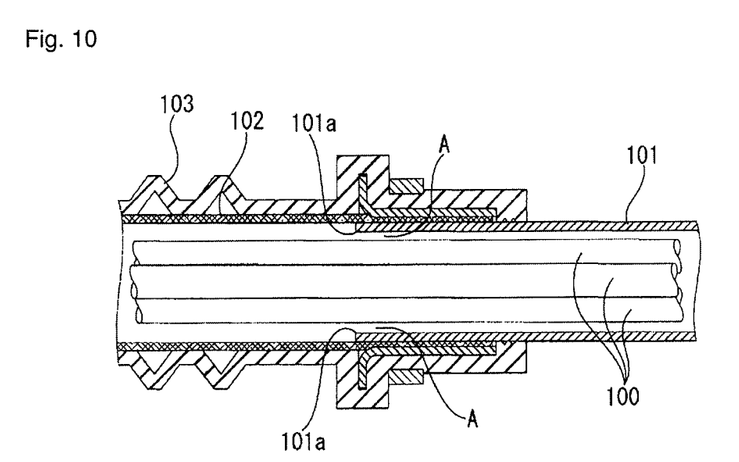
[FIG. 10] A view of a conventional example.

In hybrid automobiles and electric automobiles, a plurality of wires included in a wire harness which is routed between a battery and an inverter or between an inverter and a motor are conventionally inserted through a metal shield pipe and wired in many cases. In Japanese Patent Laid-Open Publication No. 2006-311699 (Patent Literature 1), for instance, a plurality of wires 100 are inserted through a metal shield pipe 101, as shown in FIG. 10, in a wiring path underneath an underbody, while the wires 100 are inserted through a flexible shield member 102 composed of metal braided wires and connected to an end portion of the shield pipe 101 and wired in a bending wiring path in a limited space, such as in an engine compartment. In addition, for waterproofing and wire protection purposes, a rubber grommet 103 is externally mounted on the flexible shield member 102.

CITATION LIST

Patent Literature

Patent Literature 1: Japanese Patent Laid-Open Publication No. 2006-311699

SUMMARY OF INVENTION

Technical Problem

However, a gap A is formed around the plurality of wires 100 inserted in the cylindrical shield pipe 101. Due to vibration of a vehicle body, the wires 100 in the shield pipe 101 may move in a diameter direction of the pipe while interfering with one another, or due to a routing direction of the wires 100 being pulled out, the plurality of wires 100 inserted in the shield pipe 101 may incline in the diameter direction of the pipe. Under such a circumstance, the wires 100 may be brought into contact with an edge 101a of an end portion of the shield pipe 101 and be damaged.

An object of the present invention is to prevent a plurality of wires from being damaged due to contact with an edge of an end portion of a shield pipe through which the wires are inserted.

Solution to Problem

To address the circumstance above, a first aspect of the present invention provides a partitioned shield pipe through which a wire harness having a plurality of wires routed in one of a hybrid automobile and an electric automobile is inserted, the shield pipe including a plurality of partition walls separating the plurality of wires one by one and integrally projecting radially in a cross section from an inner surface of a peripheral wall of a metal pipe main body, the partition walls extending in an axis direction and each having at least one bending portion in a middle position in a diameter direction of the partition wall, the bending portion extending in the axis direction, in which a rubber stopper press-fit space is defined by positioning end positions of the partition walls further inward than an end position of the peripheral wall of the pipe main body to provide a space from the end position of the peripheral wall to the end positions of the partition walls such that a rubber stopper attached to the wires is press-fitted, and alternatively, ends of partition wall central portions ranging from the radial center position to the bending portions of the partition walls project further than partition wall outer portions ranging from the bending portions to the peripheral wall of the pipe main body and than an end of the peripheral wall of the pipe main body such that the wires are bundled by a bundling band.

Thus, the partition walls corresponding to the number of inserted wires project radially in the cross section from the inner surface of the peripheral wall of the pipe main body of the shield pipe through which the plurality of wires are inserted such that the partition walls separate the wires one by one in the pipe main body. Unlike a conventional pipe, the wires in the shield pipe are prevented from interfering with one another, or moving or inclining in a diameter direction of the pipe in this configuration. The wires are separated and aligned in parallel in the shield pipe main body, and thus the wires are unlikely to be brought into contact with an edge of the end portion of the pipe. Furthermore, even in a case where the wires are brought into contact with the edge of the end portion of the shield pipe, a contact force thereof is substantially reduced compared with a conventional one, thus effectively preventing damage to the wires.

In addition, each of the partition walls projecting radially in the cross section from the inner periphery of the peripheral wall of the pipe main body has the bending portion in the middle position in the diameter direction, and the bending portion extends in the axis direction. This allows each partition wall to readily bend in the diameter direction. Thus, even in a case where the shield pipe needs to be bent due to a shape of a wiring area, the shield pipe can be bent relatively easily. Although each partition wall may have two or more bending portions, each partition wall preferably has one bending portion due to ease of processing.

The partition walls provided radially in the cross section preferably have a center axis of the pipe main body as a radial center position and the bending portion of the partition wall preferably has an obtuse angle. Furthermore, two adjacent partition walls and the peripheral wall of the pipe main body preferably define an insertion space for each of the wires, the insertion space having an identical cross-sectional shape.

Thus, the obtuse bending angle of the bending portion of the partition wall reduces excessive projection of the bending portion and prevents damage to an inserted wire due to contact with the projecting bending portion.

The partition wall preferably has at least one bending portion in a position of 30% to 80% of a radius of the pipe main body from the radial center position on the center axis of the pipe main body. The partition wall is preferably thinner than the peripheral wall of the pipe main body.

In a case where diameters of inserted wires are substantially the same, in particular, wire insertion spaces each defined by two adjacent partition walls and the peripheral wall of the pipe main body have identical cross-sectional shapes as described above such that movable spaces for the wires are approximately the same to equally protect the wires from damage caused by the edge of the end portion of the pipe main body. Specifically, in a case where two wires having same diameters are inserted through the shield pipe, for example, two partition walls preferably project radially in a cross section from the radial center position at a center angle of 180°. In a case where three wires are inserted, three partition walls preferably project radially in a cross section from the radial center position at a center angle of 120°. In a case where four wires are inserted, four partition walls preferably project radially in a cross section from the radial center position at a center angle of 90°. Furthermore, the distance from the radial center position to the bending portion and the bending angle and bending direction of the bending portion are preferably the same.

Meanwhile, in a case where inserted wires have different diameters, it is unnecessary for the insertion spaces for the wires to have the identical cross-sectional shape and the center angle defined by the adjacent partition walls may be different according to diameters of the wires.

The peripheral wall of the pipe main body and the partition walls are integrally formed by extrusion-molding of a metal. Aluminum is preferred as a metal since it is lightweight. Alternatively, a stainless or iron metal may be used. In addition, a double-layer structure may be employed in which a resin is coated on an outer peripheral surface of the pipe main body.

Furthermore, a resin protection cover may be attached to the end portion of the partitioned shield pipe to jointly cover an edge of an end portion of the peripheral wall of the pipe main body and edges of end portions of the partition walls.

Thus, the resin protection cover jointly covering the edge of the end portion of the peripheral wall of the pipe main body and the edges of the end portions of the partition walls is attached to the end portion of the partitioned shield pipe. This prevents the wires from direct contact with the edges of the end portion of the peripheral wall and the end portions of the partition walls, and thus further effectively protects the wires from damage due to contact with the edges.

The protection cover is preferably fixated to the end portion of the shield pipe by engaging a lock portion and a locked portion.

A specific configuration of the protection cover is not particularly limited. An example configuration may include a covering portion and a plurality of insertion portions, the covering portion having a cross-sectionally square U shape and jointly covering the edge of the end portion of the peripheral wall of the pipe main body and the edges of the end portions of the partition walls, the insertion portions each extending from the covering portion and being inserted into the pipe main body along the inner surface of the peripheral wall. A projecting lock portion is provided on an outer surface of the insertion portion and a locked portion (lock hole) engaged with the lock portion is provided in the peripheral wall in a corresponding position.

In the present invention, as described above, a rubber stopper press-fit space is defined by positioning end positions of the partition walls further inward than an end position of the peripheral wall of the pipe main body to provide a space from the end position of the peripheral wall of the pipe main body to the end positions of the partition walls such that a rubber stopper through which wires pulled out from the partitioned shield pipe are passed is press-fitted in the rubber stopper press-fit space.

According to the configuration above, the wires inserted in a state aligned by the partition walls in the pipe main body are passed through and pulled out in the aligned state from the rubber stopper which is press-fitted in the rubber stopper press-fit space at the end portion of the shield pipe. This prevents the wires from being brought into contact with the edge of the end portion of the peripheral wall of the pipe main body and the edges of the end portions of the partition walls, thus more reliably protecting the wires from damage.

In addition, simply press-fitting the rubber stopper into the end portion of the partitioned shield pipe protects the inside of the shield pipe from water. Thus, an area connected to the pipe main body, which is conventionally a waterproof section, can be provided as a non-waterproof section, thus reducing cost.

The rubber stopper preferably has through-holes through which the wires pulled out from the partitioned shield pipe are passed in a sealed state. A seal lip tightly attached to an outer peripheral surface of each of the passed wires preferably projects continuously in a circumferential direction from an inner peripheral surface of each of the through-holes. A seal lip tightly attached to the inner surface of the peripheral wall of the pipe main body preferably projects continuously in the circumferential direction from an outer peripheral surface of the rubber stopper.

Thus, the seal lips are provided to the inner peripheral surface of the through-hole of the rubber stopper and the outer peripheral surface of the rubber stopper. This concurrently increases sealability between the inner peripheral surface of the through-hole of the rubber stopper and the outer peripheral surface of the wire and sealability between the outer peripheral surface of the rubber stopper and the inner peripheral surface of the peripheral wall of the pipe main body, thus effectively preventing water from entering inside the pipe. In addition, a slit may be provided in the rubber stopper to open each of the through-holes such that the rubber stopper is attached to the wire later.

The rubber stopper press-fitted in the rubber stopper press-fit space and the pipe main body may readily be taped for fixation.

Furthermore, in the present invention, as described above, ends of partition wall central portions ranging from the radial center position to the bending portions of the partition walls project further than partition wall outer portions ranging from the bending portions to the peripheral wall of the pipe main body and than an end of the peripheral wall of the pipe main body such that wires pulled out from the partitioned shield pipe are bundled by a bundling band in a state where the wires are in contact with the projecting partition wall central portions.

Thus, the wires pulled out from the partitioned shield pipe are simply brought into contact with the partition wall central portions having the projecting ends and bundled by the bundling band. This prevents the wires from being brought into contact with the end edges of the peripheral wall and the partition wall outer portions positioned on an outer peripheral side of the pipe. Furthermore, the wires are bundled in an aligned state in which the wires are in contact with the partition wall central portions. This also prevents the wires from being damaged due to contact with the edges of the end portions of the partition wall central portions. Specifically, the configuration further ensures protection from damage to the wires pulled out from the partitioned shield pipe.

A projection size of the partition wall central portion is preferably greater than a band width of the bundling band. A size in a diameter direction of the pipe in the partition wall central portion is preferably defined such that the bundling band bundling the wires is not in contact with a side end edge of the projecting partition wall central portion.

Thus, the projection size of the partition wall central portion is defined greater than the band width of the bundling band, allowing stable bundling of the wires to the projecting partition wall central portions as bases.

Furthermore, the size in the diameter direction of the pipe in the partition wall central portion, specifically, the size from the radial center to the bending portion of the partition wall, is defined appropriately such that the bundling band that winds around and bundles the wires is not in contact with the side end edge of the projecting partition wall central portion. This prevents damage to the bundling band as well.

In addition, the end portion of the partition wall central portion can be chamfered to remove a corner portion in the end portion of the projecting partition wall central portion, thus further reducing a possibility of damage to the wires.

Advantageous Effects of Invention

As described above, in the partitioned shield pipe of the present invention, the partition walls corresponding to the number of inserted wires project radially in the cross section from the inner surface of the peripheral wall of the pipe main body through which the plurality of wires are inserted such that the partition walls separate the wires one by one in the pipe main body. Unlike a conventional pipe, the wires in the shield pipe are prevented from interfering with one another, or moving or inclining in the diameter direction of the pipe. The wires are separated and aligned in parallel in the pipe main body, and thus the wires are unlikely to be brought into contact with the edge of the end portion of the pipe. Even in a case where the wires are brought into contact with the edge of the end portion of the shield pipe, a contact force thereof is substantially reduced compared with a conventional one, thus effectively preventing damage to the wires.

Furthermore, as described above, at least one bending portion extending in the pipe axis direction is provided in each of the partition walls which radially project in the cross section from the inner wall of the peripheral wall of the pipe main body, thus allowing the partition walls to be flexible. Accordingly, even in a case where the shield pipe needs to be bent due to a shape of a wiring area, the shield pipe can be bent relatively easily.

Furthermore, in the present invention, the end positions of the partition walls of the partitioned shield pipe are positioned further inward than the end position of the peripheral wall. Then, the rubber stopper, through which the wires pulled out from the partitioned shield pipe are passed, can be press-fitted to the space from the end position of the peripheral wall to the end positions of the partition walls (rubber stopper press-fit space). Thus, the wires inserted in a state aligned by the partition walls in the partitioned shield pipe are passed through and pulled out in the aligned state from the rubber stopper which is press-fitted in the rubber stopper space in the end portion of the shield pipe. This prevents the wires from being brought into contact with the edge of the end portion of the peripheral wall and the edges of the end portions of the inner partition walls, thus reliably protecting the wires from damage.

In addition, simply press-fitting the rubber stopper into the end portion of the partitioned shield pipe protects the inside of the shield pipe from water. This allows an area connected to the pipe, which is conventionally a waterproof section, to be provided as a non-waterproof section, thus reducing cost.

Alternatively, the ends of the partition wall central portions that range from the radial center position to the bending portions project further than the partition wall outer portions that range from the bending portions to the peripheral wall of the shield pipe and than the end of the peripheral wall of the shield pipe, and the wires pulled out from the partitioned shield pipe are bundled by the bundling band in a state where the wires are in contact with the projecting partition wall central portions. Thus, the wires pulled out from the partitioned shield pipe are simply brought into contact with the partition wall central portions having the projecting ends and bundled by the bundling band. This prevents the wires from being brought into contact with the end edges of the peripheral wall and the partition wall outer portions positioned on the outer peripheral side of the pipe. Furthermore, the wires are bundled in an aligned state in which the wires are in contact with the partition wall central portions. This also prevents the wires from being damaged due to contact with the edges of the ends of the partition wall central portions.

BRIEF DESCRIPTION OF DRAWINGS

[FIG. 1] A perspective view (A) and a front view (B) of a partitioned shield pipe according to a reference first embodiment.

[FIG. 6] A perspective view (A) of a partitioned shield pipe according to the first embodiment of the present invention and a perspective view (B) of a rubber stopper press-fitted in a rubber stopper press-fit space of the partitioned shield pipe.

[FIG. 9] A perspective view (A) and a front view (B) illustrating a state in which wires are inserted through the partitioned shield pipe according to the second embodiment and are bundled by a bundling band.

DESCRIPTION OF EMBODIMENTS

Embodiments of the present invention are described below with reference to the drawings.

Figure 1:
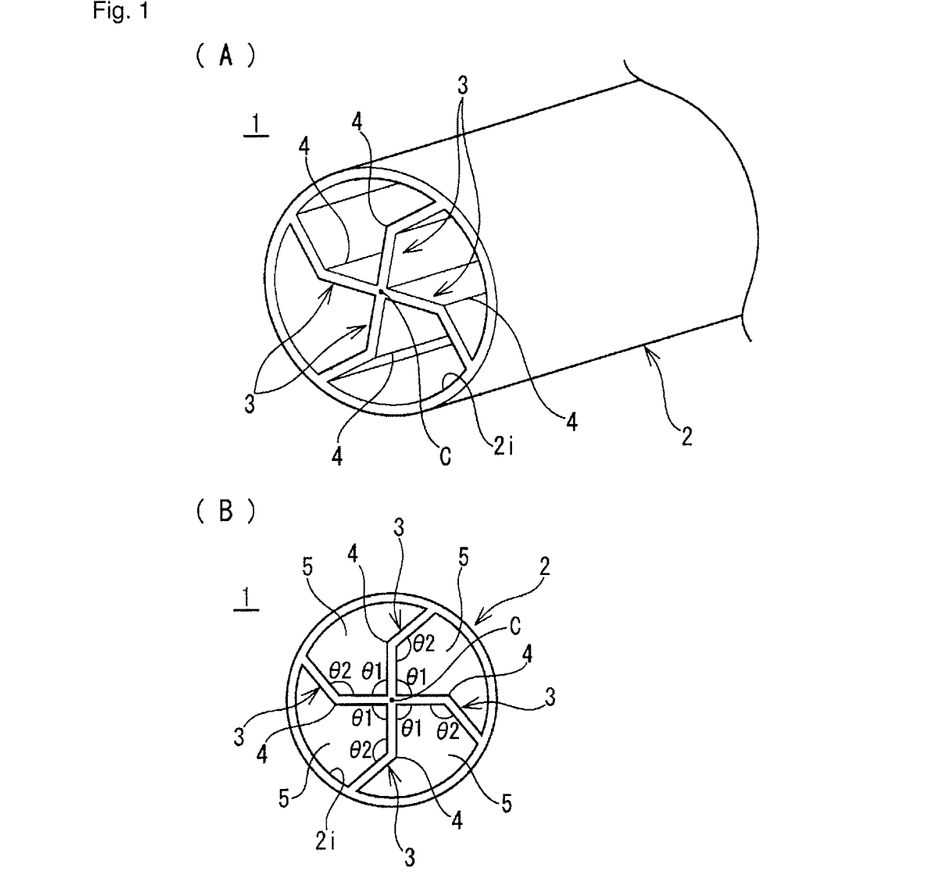
Figure 2:
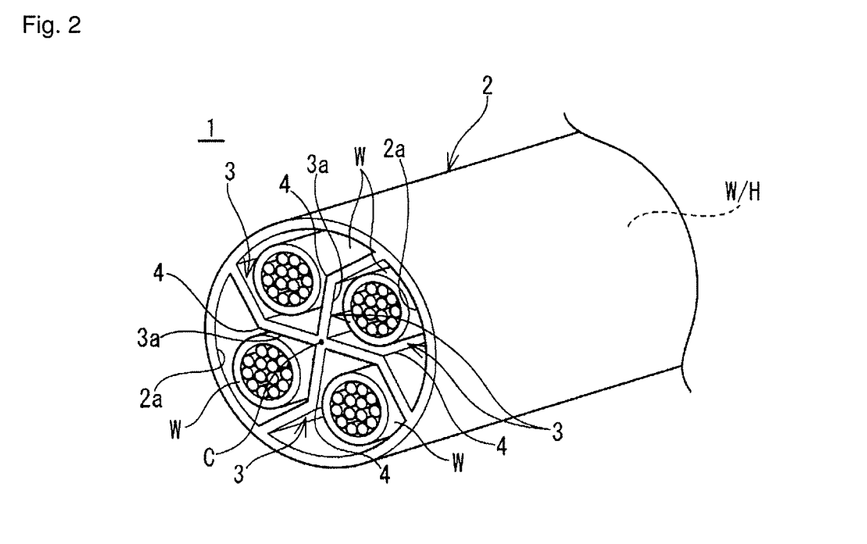
[FIG. 2] A perspective view illustrating a state in which wires are inserted through the partitioned shield pipe according to the reference first embodiment.

FIGS. 1 and 2 illustrate a reference first embodiment. In the present reference embodiment, a wire harness W/H including four insulating covered wires W (hereinafter referred to as wires W) is routed between a battery and an inverter (not shown in the drawings) of a hybrid automobile. In an underbody wiring area, a partitioned shield pipe 1 shown in FIG. 1 is externally mounted to the wire harness W/H.

The partitioned shield pipe 1 (hereinafter may be simply referred to as shield pipe 1) is composed of an aluminum metal and includes a cylindrical peripheral wall 2, which serves as a pipe main body, and four partition walls 3 each extending in an axis direction of the peripheral wall 2 and projecting from a peripheral wall inner surface 2$i$. The four partition walls 3 are formed radially in a cross section with a central axis of the shield pipe 1 as a radial center position C. A central angle θ1 defined by two adjacent partition walls 3 is 90°. The partition walls 3 are slightly thinner than the peripheral wall 2. Each of the partition walls 3 has one bending portion 4 extending in the pipe axis direction. In the present reference embodiment, a distance from the radial center position C to the bending portion 4 is approximately 50% of a radius of the shield pipe 1 and a bending angle θ2 in the bending portion 4 is approximately 130°.

The peripheral wall 2 and the partition walls 3 are formed by extrusion-molding of a metal (aluminum in the present reference embodiment).

A space 5 defined by two adjacent partition walls 3 and the peripheral wall 2 serves as a wire insertion space through which a single wire W of the wire harness W/H is inserted. Four wire insertion spaces 5 have identical cross-sectional shapes. With reference to FIG. 2, the four wires W are inserted through the four wire insertion spaces 5 respectively, thus completing external mounting of the shield pipe 1 to the wire harness W/H.

As described above, the four partition walls 3, which correspond to the number of inserted wires, project radially in the cross section from the inner wall 2i of the peripheral wall 2 of the shield pipe 1, and thus the wires W are separated by the partition walls 3 one by one in the shield pipe 1. Unlike a conventional shield pipe, the wires in the shield pipe are prevented from interfering with one another and moving in a diameter direction of the pipe. The wires W are separated and aligned in parallel in the shield pipe 1, and thus the wires W are unlikely to be brought into contact with edges 2a and 3a of end portions of the peripheral wall 2 and the partition walls 3. Even in a case where the wires W are brought into contact with the edges 2a and 3a in the end portion of the shield pipe 1, a contact force thereof is substantially reduced compared with the conventional one, thus preventing the wires W from being damaged.

Furthermore, as described above, one bending portion 4 extending in the pipe axis direction is provided in each of the partition walls 3 which radially project in the cross section from the inner wall 2i of the peripheral wall 2, thus allowing the partition walls 3 to be flexible in the diameter direction. Accordingly, even in a case where the shield pipe 1 needs to be bent due to a shape of a wiring area and the like, the shield pipe 1 can be bent relatively easily.

Since the inserted wires W have substantially the same diameters in the present reference embodiment, the four wire insertion spaces 5 have the identical cross-sectional shapes. In a case where the diameter differs for inserted wires, the cross-sectional shape or the size of the wire insertion spaces 5 may be different according to the wire diameter.

Figure 3:
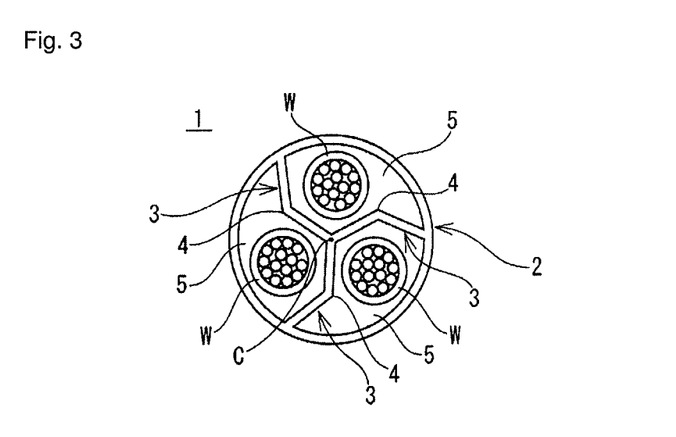
[FIG. 3] A front view of another exemplary partitioned shield pipe (a case where the number of inserted wires is three).

Furthermore, the partitioned shield pipe for four inserted wires is described in the present reference embodiment. A shield pipe can also be formed similarly for a different number of inserted wires (FIG. 3).

Figure 4:
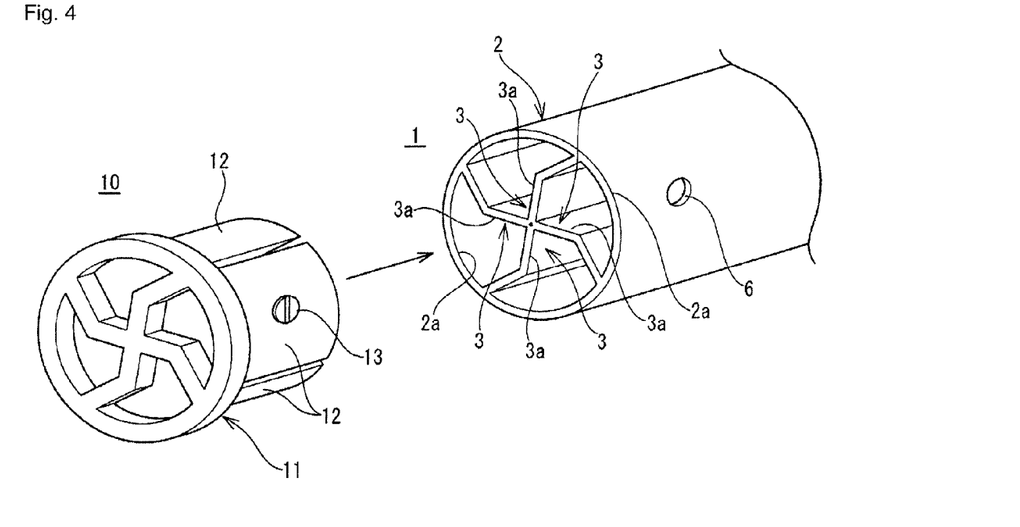
[FIG. 4] An exploded perspective view of a partioned shield pipe according to a reference second embodiment.
Figure 5:
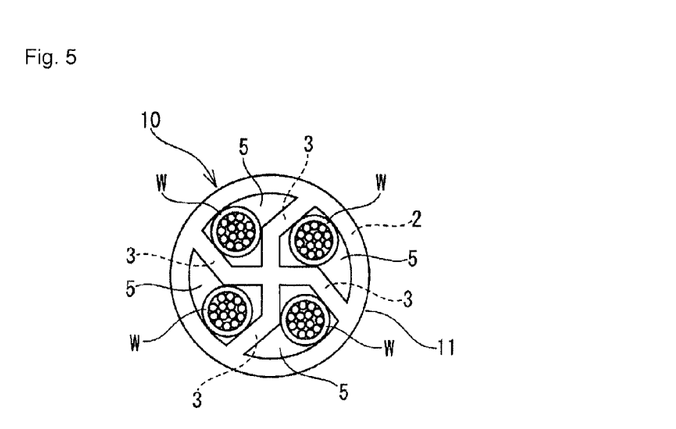
[FIG. 5] A front view illustrating a state in which wires are inserted through the partitioned shield pipe according to the reference second embodiment.

FIGS. 4 and 5 illustrate a reference second embodiment.

In the second reference embodiment, a protection cover 10 shown in FIG. 4 is attached to the end portion of the partitioned shield pipe 1 of the reference first embodiment.

The protection cover 10 has a covering portion 11 and a plurality of insertion portions 12, the covering portion 11 having a cross-sectionally square U shape and jointly covering the edge 2a of the end portion of the peripheral wall 2 that serves as a pipe main body and the edges 3a of the end portions of the partition walls 3, the insertion portions 12 extending from the covering portion 11 and being inserted into the shield pipe 1 along the inner surface 2i of the peripheral wall. A projecting lock 13 is provided on an outer surface of the insertion portion 12 and a lock hole 6 engaged with the lock 13 is provided in the peripheral wall 2 in a corresponding position.

The lock 13 and the lock hole 6 are engaged so as to fixate the protection cover 10 to the end portion of the partitioned shield pipe 1, and then wires W are inserted through the four wire insertion spaces 5 one at a time (FIG. 5).

As described above, the resin protection cover 10 jointly covering the edge 2a of the end portion of the peripheral wall 2 and the edges 3a of the end portions of the partition walls 3 of the partitioned shield pipe 1 is attached to the end portion of the shield pipe 1. This prevents the wires W from being brought into direct contact with the edge 2a of the end portion of the peripheral wall 2 and the edges 3a of the end portions of the partition walls 3, thus effectively protecting the wires W from damage due to contact with the edges.

Figure 6:
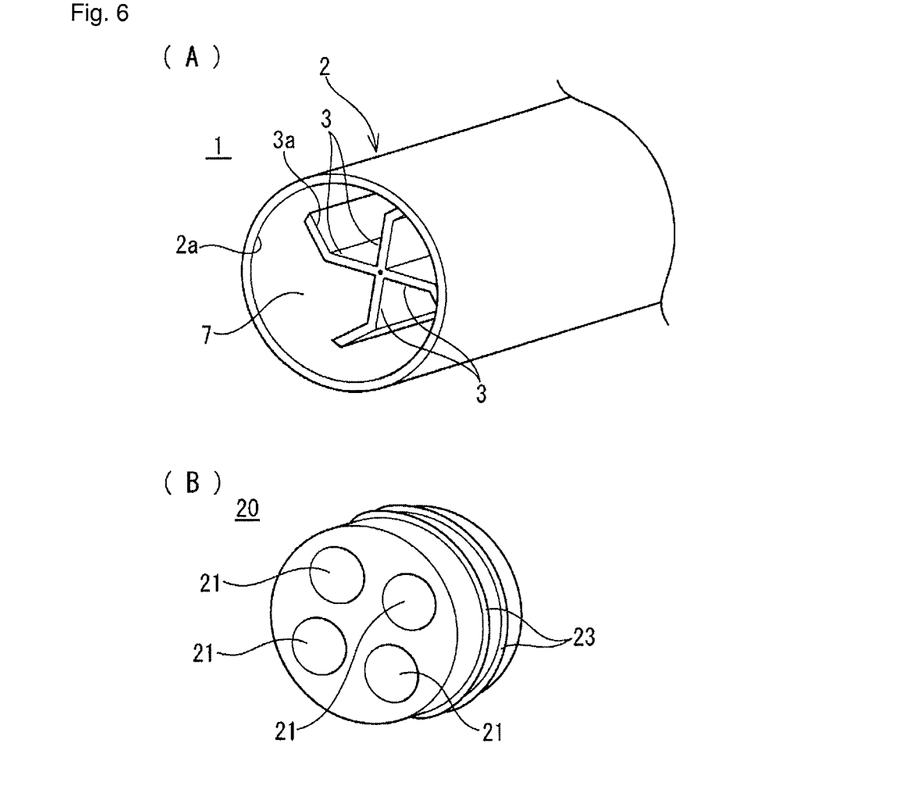
Figure 7:
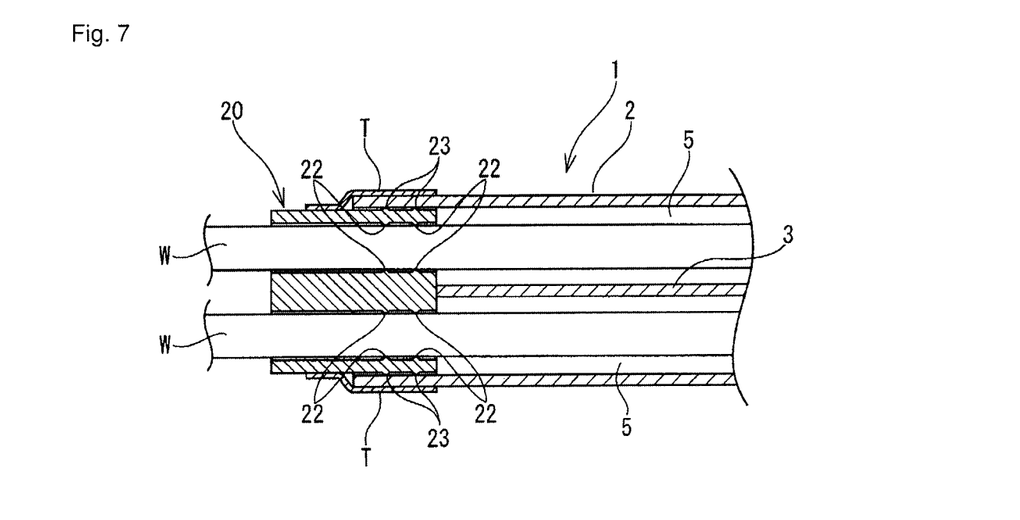
[FIG. 7] A cross-sectional view illustrating a state in which wires are inserted through the partitioned shield pipe according to the first embodiment and the rubber stopper through which the wires are passed is press-fitted in the rubber stopper press-fit space of the partitioned shield pipe.

FIGS. 6 and 7 illustrate the first embodiment of the present invention.

In the first embodiment, end positions of the partition walls 3 are provided further inward than an end position of the peripheral wall 2 of the partitioned shield pipe 1 of the aforementioned reference first embodiment, as shown in FIG. 6(A). A space from the end position of the peripheral wall 2 to the end positions of the partition walls 3 is defined as a rubber stopper press-fit space 7, in which a rubber stopper 20 shown in FIG. 6(B) is press-fitted.

The rubber stopper 20 has four through-holes 21, through which four wires W pulled out from the partitioned shield pipe 1 are passed respectively in a sealed state. A seal lip 22 continuously projects from an inner peripheral surface of the through-hole 21 in a circumferential direction so as to be pressed against and tightly attached to an outer circumferential surface of the wire W. Furthermore, a seal lip 23 continuously projects from an outer peripheral surface of the rubber stopper 20 in a circumferential direction so as to be pressed against and tightly attached to the inner surface 2i of the peripheral wall 2.

With reference to FIG. 7, the wires W inserted through the wire insertion spaces 5 and pulled out from the end portion of the partitioned shield pipe 1 are passed through the through-holes 21 of the rubber stopper 20, and then the rubber stopper 20 is press-fitted into the rubber stopper press-fit space 7 of the shield pipe 1. After the rubber stopper is press-fitted, an adhesive tape T is wound around outer peripheries of the rubber stopper 20 and the partitioned shield pipe 1.

According to the configuration above, the wires W inserted in a state aligned by the partition walls 3 in the partitioned shield pipe 1 are passed through and pulled out in the aligned state from the rubber stopper 20 which is press-fitted in the rubber stopper press-fit space 7 in the end portion of the shield pipe. This prevents the wires W from being brought into contact with the edge 2a of the end portion of the peripheral wall 2 and the edges 3a of the end portions of the inner partition walls 3, thus reliably protecting the wires W from damage.

In addition, simply press-fitting the rubber stopper 20 into the end portion of the partitioned shield pipe 1 protects the inside of the shield pipe 1 from water. Thus, an area connected to the shield pipe 1, which is conventionally a waterproof section, can be provided as a non-waterproof section, thus reducing cost.

Figure 8:
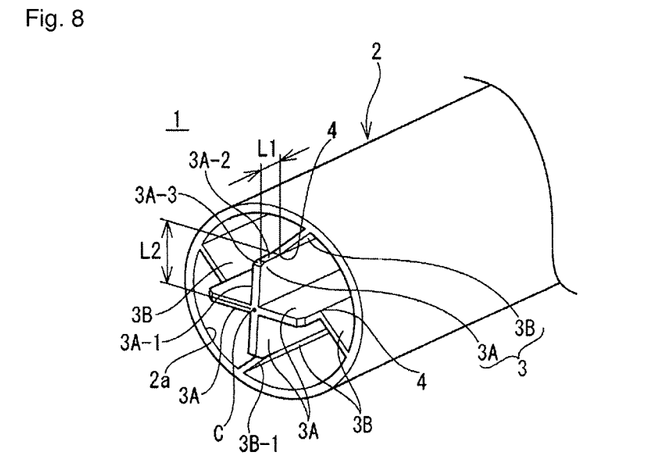
[FIG. 8] A perspective view of a partitioned shield pipe according to the second embodiment of the present invention.
Figure 9:
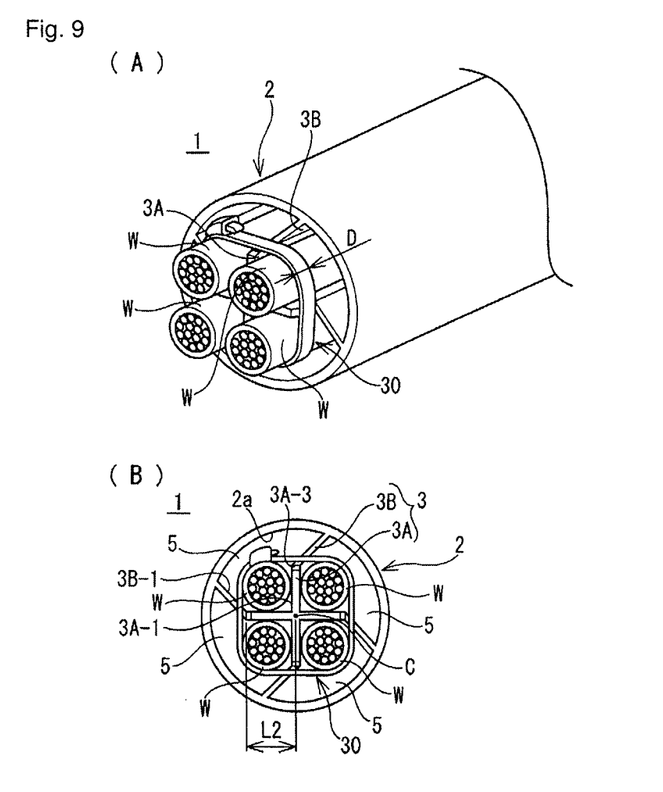

FIGS. 8 and 9 illustrate the second embodiment of the present invention.

In the second embodiment, of the partition walls 3 of the partitioned shield pipe 1 of the aforementioned reference first embodiment, ends of partition wall central portions 3A, which range from the radial center position C to the bending portions 4 of the partition walls 3, project forward further than the end of the peripheral wall 2 and ends of partition wall outer portions 3B, which range from the bending portions 4 of the partition walls 3 to the peripheral wall 2, as shown in FIG. 8. Then, the four wires W inserted through the wire insertion spaces 5 and pulled out from the end portion of the partitioned shield pipe 1 are brought into contact with the projecting partition wall central portions 3A, and then the four wires W are bundled in such a state by a commercially available bundling band 30, as shown in FIGS. 9(A) and (B).

A projection size L of the partition wall central portion 3A is greater than a width D of the bundling band 30 such that the four wires W are bundled in a stable manner to the projecting partition wall central portions 3A as bases. A size L2 in the diameter direction of the pipe of the partition wall central portion 3A (specifically, a size from the radial center position C to the bending portion 4) is shorter than the diameter of the wire W such that the bundling band 30, which bundles the four wires W in contact with the projecting partition wall central portions 3A, is not in contact with a side end edge 3A-2 of the partition wall central portion 3A. In addition, for more reliable prevention of damage to the wires W, a corner portion 3A-3 of the end portion of the projecting partition wall central portion 3A is chamfered.

As described above, the wires W pulled out from the partitioned shield pipe 1 are simply brought into contact with the partition wall central portions 3A having the projecting ends and bundled by the commercially available bundling band 30. This prevents the wires W from being brought into contact with the end edges 2a and 3B-1 of the peripheral wall 2 and the partition wall outer portions 3B positioned on an outer peripheral side of the pipe. Furthermore, the wires W are bundled in an aligned state in which the wires W are in contact with the partition wall central portions 3A. This also prevents the wires W from being damaged due to contact with the end edges 3A-1 of the partition wall central portions 3A. Specifically, the configuration of the present embodiment further ensures protection from damage to the wires W pulled out from the partitioned shield pipe 1.

REFERENCE SIGNS LIST

1: Partitioned shield pipe
2: Peripheral wall (pipe main body)
3: Partition wall
3A: Partition wall central portion
3B: Partition wall outer portion
4: Bending portion
5: Wire insertion space
6: Lock hole
7: Rubber stopper press-fit space
10: Protection cover
13: Lock
20: Rubber stopper
21: Through-hole
22, 23: Seal lip
30: Bundling band
W: Wire
C: Radial center position

The invention claimed is:

1. A partitioned shield pipe through which a wire harness having a plurality of wires routed in one of a hybrid automobile and an electric automobile is inserted, the shield pipe comprising:
  a plurality of partition walls separating the plurality of wires one by one and integrally projecting radially in a cross section from an inner surface of a peripheral wall of a metal pipe main body,
  the partition walls extending in an axis direction and each having at least one bending portion in a middle position in a diameter direction of the partition wall, the bending portion extending in the axis direction; wherein either
  a rubber stopper press-fit space is defined by positioning end positions of the partition walls further inward than an end position of the peripheral wall of the pipe main body to provide a space from the end position of the peripheral wall to the end positions of the partition walls such that a rubber stopper attached to the wires is press-fitted; or
  ends of partition wall central portions ranging from the radial center position to the bending portions of the partition walls project axially further than partition wall outer portions ranging from the bending portions to the peripheral wall of the pipe main body and further than an end of the peripheral wall of the pipe main body, such that the wires are bundled by a bundling band.

2. The partitioned shield pipe according to claim 1, wherein the partition walls provided radially in the cross section have a center axis of the shield pipe as a radial center position and the bending portion of the partition wall has an obtuse angle, and
  two adjacent partition walls and the peripheral wall of the shield pipe define an insertion space for each of the wires, the insertion space having an identical cross-sectional shape.

3. The partitioned shield pipe according to claim 1, wherein the peripheral wall of the pipe main body and the partition walls are integrally formed by extrusion-molding of a metal.

4. The partitioned shield pipe according to claim 1, further comprising:
  a resin protection cover attached to jointly cover an end portion of the pipe main body and end portions of the partition walls.

5. The partitioned shield pipe according to claim 4, wherein the protection cover is fixated to the end portion of the pipe main body by engaging a lock portion and a locked portion.

6. A wire protection structure for an end portion of a partitioned shield pipe, wherein
  a rubber stopper through which wires pulled out from the partitioned shield pipe are passed is press-fitted in a rubber stopper press-fit space provided at end positions of the partition walls of the partitioned shield pipe according to claim 1.

7. A wire protection structure for an end portion of a partitioned shield pipe, wherein wires pulled out from the partitioned shield pipe according to claim 1 are bundled by a bundling band in a condition in which the wires are in contact with the partition wall central portions projecting axially further than the partition wall outer portions of the partition walls and the end of the peripheral wall of the pipe main body of the shield pipe.

8. The wire protection structure for the end portion of the partitioned shield pipe according to claim 7, wherein
  a projection size of the partition wall central portion is greater than a band width of the bundling band, and
  a size in a diameter direction of the pipe of the partition wall central portion is defined such that the bundling band bundling the wires is not in contact with a side end edge of the projecting partition wall central portion.

* * * * *